United States Patent [19]

Dunmire et al.

[11] Patent Number: 5,049,716

[45] Date of Patent: Sep. 17, 1991

[54] STEAM TURBINE HAVING APPLIED NOVEL EROSION RESISTANT SURFACES AND METHODS FOR APPLYING THESE SURFACES

[75] Inventors: James C. Dunmire, Longwood; Samuel D. Reynolds, Jr., Oviedo, both of Fla.

[73] Assignee: Westinghouse Electric Corp., Pittsburgh, Pa.

[21] Appl. No.: 390,138

[22] Filed: Aug. 7, 1989

[51] Int. Cl.$^5$ .............................................. B23K 9/04
[52] U.S. Cl. ......................... 219/76.14; 219/137 WM
[58] Field of Search ............ 219/76.14, 76.1, 137 WM

[56] References Cited

U.S. PATENT DOCUMENTS 4,521,663  6/1985  Kesting .............................. 219/76.14
4,897,519  1/1990  Clark et al. ....................... 219/76.14

FOREIGN PATENT DOCUMENTS 223963  11/1968  U.S.S.R. ............................ 219/76.14

Primary Examiner—Clifford C. Shaw

[57] ABSTRACT

Methods for providing erosion resistant surfaces to carbon steel turbine components are provided by this invention. The methods include welding a steel weldment comprising at least 12 wt. % Cr. on to a carbon steel steam turbine component at a welding speed of about 24–52 inches, 61–132 cm, per minute in a nominal first pass thickness of less than about 0.1 inches, 0.25 cm. Preferred flux-cord-arc welding (FCAW) techniques are disclosed for vertical down, overhead, horizontal and flat surfacing positions.

21 Claims, No Drawings

A STEAM TURBINE HAVING APPLIED NOVEL EROSION RESISTANT SURFACES AND METHODS FOR APPLYING THESE SURFACES

FIELD OF THE INVENTION

This invention relates to methods for providing erosion resistant surfaces to carbon steel steam turbine components, and more particularly, to synergistic welding variables for depositing metallurgically bonded erosion resistant alloys on pressure containing parts without the introduction of unacceptable distortion.

BACKGROUND OF THE INVENTION

Certain portions of steam turbines, such as those employed in nuclear power plants, utilize pressure containment parts, made of ASME P-1 carbon steel. This material is not highly erosion resistant, but meets selected other engineering requirements. During the operation of steam turbines, the steam flow path through the turbine often causes unpredictable thermal-hydraulic characteristics, such as high velocity turbulent conditions, which result in an erosion-corrosion effect on these carbon steel parts. This erosion-corrosion reaction over time decreases the wall thickness of the pressure containing members and produces a rough surface. The rough surface, in turn, accelerates the effect of the erosion-corrosion reaction and further increases turbulence within the steam flow path.

To minimize erosion-corrosion damage in steam turbines, it has become necessary to provide a surface that exhibits resistance to the erosion-corrosion process. Since powder metallized surfaces are merely mechanically bonded and could result in eroded and detached pieces being pulled into the turbine, metallurgically bonded protecting alloys are preferred.

Typically, metallurgically bonded surfacing is applied with conventional arc welding methods with a variety of filler metals. However, conventional welding methods can lead to shrinkage stresses, excess heat input and thermal gradients within the base metal which often produce unacceptable distortion of the pressure containing parts. Such distortion can make it impossible to produce the required metal-to-metal steam containment necessary for turbine operation, therefore, additional grinding, machining, and/or temporary sealing compounds are generally required.

Accordingly, there is a need for a method of providing an erosion resistant surface to carbon steel steam turbine components which meets substantially all of the selected engineering requirements without causing appreciable deformation of the base metal during application. There is also a need to provide a metallurgically bonded erosion resistant surface to pressure containment parts which can withstand the harsh climate of erosion-corrosion effects. There is a further need for a surfacing operation which is capable of field application without the use of complicated positioning equipment.

SUMMARY OF THE INVENTION

This invention provides carbon steel steam turbine components having erosion resistant surfaces and methods for providing same. The method of this invention provides a carbon steel steam turbine component having a first surface thereon capable of being exposed to pressurized steam. Upon this surface is welded a first weldment comprising steel having at least 12 wt.% Cr. The weldment is disposed on the surface of the turbine component at a high rate of welding speed of about 24-52 inches, 61-132 cm, per minute in a nominal first pass thickness of less than about 0.1 inches, 0.25 cm.

Accordingly, this invention provides a novel combination of synergistic welding variables and alloys capable of producing the desired metallurgically-bonded erosion resistant surfaces without significant base metal distortion. The welding processes disclosed herein include semi-automatic flux-cored-arc welding processes (FCAW), also referred to by the ASME as gas-metal-arc-welding (GMAW), which make it possible to deposit very long continuous weld beads which decrease distortion by decreasing the number of welding thermal cycles involved. The invention specifically selects formulated flux-cored filler metals designed for fast deposition to provide higher travel rates for minimum heat input. Specifically, the use of an austenitic face-centered cubic, high chromium filler metal, is employed which produces a very ductile weld bead, or weldment, with high erosion resistance and sufficient yield strength.

In more detailed aspects of this invention, high speed vertical down welding positions are employed for providing relatively thin, sound weld bead configurations which deform preferentially to the base metal mass, thus minimizing turbine casing distortion.

It is, therefore, an object of this invention to provide a method of metallurgically bonding erosion-resistant surfaces to carbon steel steam turbine components without significant distortion.

It is still another object of this invention to provide welded erosion resistant surfaces which are significantly defect free and accommodate the expansion and contraction of the underlying carbon steel base metal.

With these and other objects in view, which will become apparent to one skilled in the art as the description proceeds, this invention resides in the novel construction, combination, arrangement of parts and methods substantially as hereinafter described and more particularly defined by the attached claims.

DETAILED DESCRIPTION OF THE INVENTION

The present invention provides erosion resistant surfaces to carbon steel steam turbine components. The components contain a surface capable of being exposed to pressurized steam. This surface is welded with a weldment comprising steel having at least 12 wt.% Cr., which is deposited onto the surface at a speed of about 24-52 inches, 61-132 cm, per minute with a nominal first pass thickness of less than about 0.1 inches, 0.25 cm.

This invention also includes a method of welding an erosion resistant surface onto a carbon steel steam turbine component comprising the steps of: providing a carbon steel steam turbine component having less then about 0.35 wt.% C and having a first surface thereon, and flux-cored-arc welding an austenitic stainless steel onto the first surface in a first weldment having a thickness of less than about 0.1 inches, 0.25 cm, this flux-cored-arc welding step employs a welding speed of about 48-52 inches, 122-132 cm, per minute at about 160-180 amps. of direct current in a vertical down welding position.

This invention also pertains to a steam turbine system including a substantially distortion-free carbon steel steam turbine component having a welded surface for providing erosion resistance to pressurized steam, wherein the welded surface comprises a double-pass weldment of less than about 0.15 inches, 0.38 cm, of a stainless steel, preferably an austenitic stainless steel having at least about 12 wt.% Cr, such as E309L.

This invention can be advantageously employed in the application of the erosion surfacing to steam turbine components, base metal restoration for retarding or stopping further base metal erosion, and coatings for high pressure cylinders, and the like. This invention has proved to be useful in various configurations, including bead-on-plate, etc.

In the most preferred welding processes of this invention, the carbon steel steam turbine component is cleaned prior to welding. Disc sanding, grinding and other superficial metal working processes are preferred for removing scale, oxides, rust and other surface contaminants. Following one of these processes, the surface is preferably wiped with a non-residue bearing, petroleum based, cleaning agent, such as mineral spirits followed by methyl alcohol, etc. All remaining traces of oil, grease, paint or other films should be wiped off with a clean, dry, lint-free cloth.

The welding step of this invention is preferably carried out by a flux-cored-arc welding procedure, although gas tungsten arc, gas metal arc, and plasma welding could be less favorably employed. Flux-cored-arc-welding processes make it possible for the deposition of very long, continuous weld beads, the application of which decreases distortion by decreasing the number of welding thermal cycles. The preferred objective of this welding procedure is to deposit erosion resistant weld metal on areas of steam turbine carbon steel components, such as P-1 carbon steels having less than about 0.35 wt.% carbon, which have experienced, or will experience, steam erosion/corrosion damage.

The disclosed techniques employ specially developed fast deposition FCAW filler metals, employing about 130–220 amps of direct current, preferably 145–180 amps of reverse polarity direct current at 24–28 volts, which minimize weld deposit thermal stresses and distortion. The ability to minimize distortion can be credited to the high travel rate deposition of thin weld beads, less that about 0.1 inches, 0.25 cm, preferably about 0.06 inches, 0.15 cm, for single pass, and less than about 0.15 inches, 0.38 cm, preferably about 0.12 inches, 0.30 cm, for double pass, at low heat input to the base metal and, wherever possible, welding vertically down. When welding in positions other than vertical down, it is also preferable to weld at high travel rates. In cases where large volumes of deposited alloy are required, such as blade ring grooves, or pipe joints, the travel rate and filler metal diameter should be adjusted for multiple pass groove type welding techniques.

The invention will be further understood in view of the following examples, which provide approximate preferred ranges for welding parameters per welding method and type of joint.

| Welding Configuration: | bead-on-plate |
|---|---|
| backing: | ASME P-1. |
| base metal: | ASME P-1, SA515 GR.65, SA216 GR. WCB. |
| weld technique: | FCAW, stringer bead, about .06 inches, .15 cm, thickness for a single layer, .12 inches, .30 cm, thickness or more for 2 layer multipass, weld travel speed about 48–52 inches, 122–132 cm/min, each bead overlapping previous bead by about 30–50%. |
| position: | vertical down, welding gun directed backward, opposite to the direction of travel, about 20°. |
| filler metal: | AWS A 5.22 class E309 LT-1, .045", .11 cm, dia. |
| shield gas: | 75% AR./25% $CO^2$ (±10%), 35–45 c.f.h., 990–1273 cubic dec. per hr. |
| preheat: | 60° F., 15.6° C. (min.), 135° F., 57.2° C. (max. interpass) |
| current + polarity: | DCRP, electrode positive |
| amps: | 160–180 |
| volts: | 24–28 |

Example II: Overhead Position Surfacing

| Welding Configuration: | bead-on-plate |
|---|---|
| backing: | ASME P-1 |
| base metal: | ASME SA515 GR.65, P-1. |
| weld technique: | FCAW, stringer bead about .06 inches, .15 cm, thick for single layer, about .12 inches, .30 cm, thick for multipass, more if required, weld travel speed about 25–35 inches, 63.5–88.9 cm/min, each bead overlapping previous bead by about 30–50%. |
| position: | overhead, welding gun directed backward, in direction of travel, about 20°. |
| filler metal: | AWS A 5.22 class E309 LT-1, .045", .11 cm, dia. |
| preheat: | 60° F., 15.6° C., min, 300° F., 148.9° C. (max. interpass) |
| current + polarity: | DCRP, electrode positive |
| Amps.: | 145–155 |
| volts: | 26–28 |

Example III: Horizontal Position Surfacing

| Welding Configuration: | bead-on-plate |
|---|---|
| backing: | ASME P-1 |
| base metal: | ASME P-1, SA515 GR.65, SA216 GR. WCB. |
| weld technique: | FCAW, stringer bead, about .06 inches, 15 cm, thick for single layer, about .12 inches, .30 cm, thick for 2 layer multipass more if required, weld travel speed about 25–35 inches, 63.5–88.9 cm/min., each bead overlapping previous bead by about 30–50%. |
| position: | horizontal, welding gun directed backward in direction of travel about 20°. |
| filler metal: | AWS A 5.22 class E309 LT-1, .045", .11 cm, dia. |
| shield gas: | 75% AR./25% $CO^2$ (±10%), 35–45 c.f.h., 990–1273 cubic dec. per hr. |
| current + polarity: | DCRP, electrode positive |
| Amps.: | 145–155 |
| Volts: | 26–28 |

Example IV: Flat Position Surfacing

| Welding Configuration: | bead-on-plate |
|---|---|
| backing: | ASME P-1 |
| base metal: | ASME P-1, SA515 GR.65, SA216 GR. WCB. |
| weld technique: | FCAW, stringer bead, about .06 inches, .15 cm, thick for single layer, about .12 inches, .30 cm, thick for 2 layer multipass, more if required, weld travel speed about 25–35 inches, 63.5–88.9 cm/min., each bead overlapping previous bead by about 30–50%. |
| position: | flat position, welding gun directed backward in direction of travel about 20°. |
| filler metal: | AWS A 5.22 class E309 LT-1, .045", .11 cm, dia. |
| shield gas: | 75% AR./25% $CO^2$ (±10%), 35–45 c.f.h., 990–1273 cubic dec. per hr. |
| current + polarity: | DCRP, electrode positive |
| Amps.: | 145–155 |
| Volts: | 26–28 |

It is further suggested that skip welding techniques be employed to minimize heat input and control distortion.

One preferred method is to make no more than 2 weld beads adjacent to one another, then move approximately 6 inches, 15.24 cm to the left or right and make no more than two more weld beads, working back and forth until the required area is completely covered.

Following welding, weld slag and scale should be removed by chipping, employing a scaling hammer, or by other mechanical means, followed by wire brushing to remove oxides, light scale, rust and welding smoke. Wire brushes employed for this purpose preferably include stainless steel bristles which are clean and free of contaminates.

The erosion resistant weld metal surfacing deposited in the above-disclosed procedures is neither exclusively hardfacing nor exclusively corrosion resistant weld overlay. It is deemed to replace the base metal with superior mechanical properties, including greater erosion resistance. The engineering properties, characteristics, and relative erosion resistance of the preferred alloy, E309L, are far superior to that of carbon steel, and hence, it is the preferred alloy.

From the foregoing, it can be realized that this invention provides novel methods for providing erosion resistant surfaces to carbon steel steam turbine components which minimize distortion and avoid machining or temporary sealing measures. Although various embodiments have been illustrated, this was for the purpose of describing, and not limiting the invention. Various modifications, which will become apparent to one skilled in art, are within the scope of this invention described in the attached claims.

We claim:

1. In a steam turbine system of the type employed for generating electric power, a method of providing an erosion resistant surface to a carbon steel steam turbine component, comprising:
    (a) providing a carbon steel steam turbine component having a first surface thereon; and
    (b) welding a first steel weldment comprising at least 12 wt.% Cr onto said first surface at a welding speed of about 61-132 cm, per minute, said weldment having a nominal first pass thickness of less than about 0.25 cm.

2. The method of claim 1 wherein said welding step comprises flux-cored-arc welding.

3. The method of claim 2 wherein said flux-cored-arc welding step comprises using about 130-220 amps of direct current.

4. The method of claim 3 wherein said flux-cored-arc welding step uses about 24-28 volts.

5. The method of claim 2 wherein said flux-cored-arc welding process uses about 145-180 amps of reverse polarity direct current.

6. The method of claim 5 wherein said flux-cored-arc welding step employs an electrode having an outer diameter of about 0.11 cm.

7. The method of claim 6 wherein said weldment has a nominal first pass thickness 0.15 cm.

8. The method of claim 6 wherein said flux-cored-arc welding step comprises employing a welding gun tilted at about 20° from said surface in a direction opposite to the direction of welding travel.

9. The method of claim 8 wherein said flux-cored-arc welding comprises spacing a pair of weldments about 15.2 cm, from a second pair of weldments.

10. The method of claim 6 wherein said flux-cored-arc welding step comprises employing a shield gas comprising argon and carbon dioxide.

11. The method of claim 2 wherein said flux-cored-arc welding step includes welding a second weldment over a portion of said first weldment to provide a total thickness of about 0.30 cm.

12. The method of claim 11 wherein said second weldment is disposed over about 30-50% of the surface area of said first weldment.

13. The method of claim 2 wherein said flux-cored-arc welding step comprises using a welding speed of about 122-132 cm, per minute, about 160-180 amps and a vertical down welding progression.

14. The method of claim 2 wherein said flux-cored-arc welding step comprises a welding speed of about 63.5-88.9 cm, per minute and about 145-155 amps in an overhead position.

15. The method of claim 2 wherein said flux-cored-arc welding step comprises a welding speed of about 63.5-88.9 cm, per minute, and about 145-155 amps in a flat position.

16. The method of claim 1 wherein said steel comprises austenitic stainless steel.

17. A method of welding an erosion resistant surface onto a carbon steel steam turbine component, comprising;
    (a) providing a carbon steel steam turbine component comprising less than about 0.35 wt.% C and having a first surface thereon; and
    (b) flux-cored-arc welding an austenitic stainless steel onto said first surface in a first weldment having a thickness of less than about 0.25 cm, said flux-cored-arc welding step comprising a speed of 122-132 cm, per minute and about 160-180 amps of direct current in the vertical down welding position.

18. In a steam turbine of the type employed for generating electric power, said steam turbine comprising a carbon steel steam turbine component having a welded surface for providing erosion resistance to pressurized steam, wherein said welded surface comprises a double-pass weldment of less than about 0.38 cm, of a stainless steel.

19. The steam turbine of claim 18, wherein said stainless steel is austenitic.

20. The steam turbine of claim 19, wherein said stainless steel comprises less than about 12 wt.% Cr.

21. The steam turbine of claim 20, wherein said stainless steel comprises E309L.

* * * * *